United States Patent [19]

Jain et al.

[11] Patent Number: 4,969,988
[45] Date of Patent: Nov. 13, 1990

[54] ANTIFOAM TO ACHIEVE HIGH CONVERSION IN HYDROCONVERSION OF HEAVY OILS

[75] Inventors: Anil K. Jain; Barry B. Pruden, both of Oakville; Dennis Lambiris, Repentigny; Serge Rivard, Montreal; Dirkson D. S. Liu, Ottawa, all of Canada

[73] Assignee: Petro-Canada Inc., Mississauga, Canada

[21] Appl. No.: 338,843

[22] Filed: Apr. 17, 1989

[30] Foreign Application Priority Data

Apr. 15, 1988 [CA] Canada ................................. 564274

[51] Int. Cl.$^5$ .............................................. C10G 1/00
[52] U.S. Cl. ................................... 208/108; 208/107; 208/131; 208/143; 208/112
[58] Field of Search ................ 208/107, 108, 131, 143

[56] References Cited

U.S. PATENT DOCUMENTS

| | | | |
|---|---|---|---|
| 3,617,503 | 11/1971 | Rogers et al. | 208/97 |
| 3,700,587 | 10/1972 | Hyde | 208/131 |
| 4,176,047 | 11/1979 | Orrell et al. | 208/51 |
| 4,176,052 | 11/1979 | Bruce et al. | 208/131 |
| 4,216,076 | 8/1980 | Dillon et al. | 208/48 |
| 4,329,528 | 5/1982 | Evans | 585/3 |
| 4,396,495 | 8/1983 | Braun et al. | 208/112 |
| 4,578,181 | 3/1986 | Derouane et al. | 208/110 |

*Primary Examiner*—Helane E. Myers
*Attorney, Agent, or Firm*—Fisher, Christen & Sabol

[57] ABSTRACT

A process for the conversion of a heavy hydrocarbon oil in the presence of hydrogen and a catalyst or additive is described. It is shown that conversion can be increased by injecting an anti-foaming agent or a solution of anti-foaming agent in light oil into the reactor. Significantly better results are obtained when the antifoam or the solution of anti-foam is injected directly into the top section of the reactor.

11 Claims, 2 Drawing Sheets

ANTIFOAM TO ACHIEVE HIGH CONVERSION IN HYDROCONVERSION OF HEAVY OILS

This invention relates to the treatment of hydrocarbon oils and, more particularly, to the hydroconversion of heavy hydrocarbon oils in the presence of additives, such as iron and/or coal additives.

Hydroconversion processes for the conversion of heavy hydrocarbon oils to light and intermediate naphthas of good quality for reforming feedstocks fuel oil and gas oil are well known. These heavy hydrocarbon oils can be such materials as petroleum crude oil, atmospheric tar bottoms products, vacuum tar bottoms products, heavy cycle oils, shale oils, coal derived liquids, crude oil residuum, topped crude oils and the heavy bituminous oils extracted from oil sands. Of particular interest are the oils extracted from oil sands and which contain wide boiling range materials from naphthas through kerosene, gas oil, pitch, etc., and which contain a large portion of material boiling above 524° C., equivalent atmospheric boiling point.

As the reserves of conventional crude oils decline, these heavy oils must be upgraded to meet the demands. In this upgrading, the heavier materials is converted to lighter fractions and most of the sulphur, nitrogen and metals must be removed.

This can be done either by a coking process, such as delayed of fluidized coking, or by a hydrogen addition process such as thermal or catalytic hydrocracking. The distillate yield from the coking process is typically about 70 wt % and this process also yields substantial amounts of coke as by-product.

Work has also been done on an alternate processing route involving hydrogen addition at high pressures and temperatures and this has been found to be quite promising. In this process, hydrogen and heavy oil are pumped upwardly through an empty tubular reactor in the absence of any catalyst. It has been found that the high molecular weight compounds hydrogenate and/or hydrocrack into lower boiling ranges. Simultaneous desulphurization, demetallization and denitrogenation reactions take place. Reaction pressures up to 24 MPa and the temperature up to 490° C. have been employed.

In thermal hydrocracking, a major problem is low rates of conversion. This is because in tubular reactors, more appropriately called bubble column reactors, a significant volume of the reactor is occupied by gas. The percentage of reactor volume occupied by gas is called gas voidage. The gas voidage is a function of reactor operating conditions, especially the gas rate. At typical operating conditions, gas voidage can be as high as 80%. This means that 80% of reactor volume is occupied by gas and is not available for liquid reaction. High gas voidage reduces the liquid residence time in the reactor, resulting in lower rate of conversion to lighter materials.

The conversion can be increased either by increasing reactor operating temperature or by increasing liquid residence time in the reactor. If the reactor temperature is increased, the coking reaction also increases. This can result in coke deposition in the reactor and costly shutdowns. The coking reaction can be controlled by increasing reaction pressure. However, plant operations at high pressure involve higher capital and operating costs.

If increased residence time is chosen to increase conversion, the total reactor volume per unit volume of reactants is increased. This option increases the reactor volume and therefore the capital cost.

Work has been done to develop additives which can suppress coking reaction or can remove the coke from the reactor. It has been shown in Ternan et al, Canadian Patent No. 1,073,389, issued March 10, 1980 and Ranganathan et al, U.S. Pat. No. 4,214,977, issued July 29, 1980, that the addition of coal or coal-based additive results in the reduction of coke deposition during hydrocracking. The coal additives act as sites for the deposition of coke precursors and thus provide a mechanism for their removal from the system.

Canadian Patent No. 1,077,917 describes a process for the hydroconversion of a heavy hydrocarbonaceous oil in the presence of a catalyst prepared in situ from trace amounts of metals added to the oil as oil soluble metal compounds.

In U.S. Pat. No. 3,775,286, a process is described for hydrogenating coal in which the coal was either impregnated with hydrated iron oxide or dry hydrated iron oxide powder was physically mixed with powdered coal. Canadian Patent No. 1,202,588 describes a process for hydrocracking heavy oils in the presence of an additive in the form of a dry mixture of coal and an iron salt, such as iron sulphate.

Development of such additives has allowed the reduction of reactor operating pressure without coking reaction. However, these developments have not solved the problem of high gas voidage in the reactor.

It is also known that foaming is a significant problem in slurry conversion processes, such as catalytic hydrocracking processes. Thus U.S. Pat. No. 4,396,495 describes the use of antifoaming agents to minimize the amount of foam and thereby enable full utilization of the reaction zone. The anti-foaming agents are typically added as part of the feedstock to the hydrocracking process.

It is an object of the present invention to provide an improved method of utilizing anti-foaming agents in hydrocracking processes.

SUMMARY OF THE INVENTION

According to the present invention, the conversion in a hydroconversion process is increased by changing the hydrodynamics in the reactor. Reactor hydrodynamics are changed by injecting an anti-foaming agent or its solution in a hydrocarbon solvent into the top section of the reactor rather than part of the feedstock. The "top section" refers to the top 30% of the reactor height.

Suitable anti-foam agents for the present invention may be selected from a wide range of commercially available products. Among the most effective anti-foam agents are the silicones, such as dialkyl siloxane polymers, polydimethyl siloxane, polydiphenyl siloxanes, polydiphenyl dimethyl siloxanes and fluorinated siloxanes. The anti-foam agent is preferably used in amounts in the range of 1 to 500 ppm based on the fresh feed to the reactor.

The anti-foaming agent is preferably mixed with a hydrocarbon solvent such as kerosene. This reduces the viscosity of the anti-foam and makes it pumpable at ambient conditions. The anti-foam solution is injected into a solvent line which carries the anti-foam solution to the top of the reactor. It has been discovered that the location of anti-foam injection plays a significant role in reducing gas voidage. When the anti-foam solution is mixed with the feedstock or when it is injected in the bottom section of the reactor, the gas voidage does not reduce significantly. However, when the same amount of anti-foam is injected into the top section of the reactor, the gas voidage in the reactor drops significantly. Lower gas voidage increases the liquid residence in the reactor, which results in higher conversion.

It has been found that in the absence of anti-foaming agent, gas voidage in the bottom section of the reactor is the lowest and in the top section, it is highest. When the anti-foaming agent is mixed with the feed or injected into the bottom section of the reactor, it causes some reduction in localized voidage in the bottom but does not have any significant effect on localized voidage in the top section. However, when the anti-foam is injected into the top section, the localized voidage in the top section decreases significantly. The localized voidages in the middle and bottom sections also reduce due to increased liquid backmixing. As a result, the overall gas voidage is much lower when the anti-foam is injected in the top section.

Injection of anti-foam into the top section of the reactor also has another important beneficial effect. It increases the liquid backmixing in the reactor. In the absence of anti-foam, liquid backmixing is quite good in the bottom section of the reactor where gas voidage is the lowest. However, the liquid backmixing is very poor in the top section of the reactor due to foam-like conditions. Overall, poor liquid backmixing causes a large temperature gradient in the reactor, which is not desirable. Under such conditions, there are hot spots and cold spots inside the reactor. Hot spots are undesirable due to coking reaction and subsequent effect on catalyst activity due to coke deposition. Cold spots are also undesirable due to lower rate of reaction in these zones. Furthermore, poor liquid backmixing increases the risk of gas and liquid mal-distribution in the reactor.

It has now been discovered that injection of anti-foam into the top section of the reactor solved all these problems. Since the foaming condition is eliminated, the liquid backmixing in the reactor is increased by an order of magnitude. Increased liquid backmixing reduces the temperature gradient in the reactor. It also eliminates or reduces the degree of hot spots and cold spots.

Another benefit of injecting anti-foam into the top section of the reactor is the improved mixing of solids in three-phase slurry hydrocracking reactors. In cases where a disposable catalyst or additive is employed to carry out hydrogenation reaction, it is important to prevent accumulation of solids in the reactor. It was discovered that in the absence of anti-foam, significant amounts of solids accumulated in the reactor. These solids occupied the reactor volume and proportionally reduced the reactor volume available for liquid reaction. In addition, the solids concentration can become unacceptably high. In order to maintain the solids concentration within acceptable levels, it becomes necessary to drag these solids from the reactor.

As mentioned above, without anti-foam, the liquid back-mixing in the top section of the reactor is quite poor. Consequently, the solids mixing is also poor, resulting in large concentration gradient. This causes the solids concentration in the bottom section of the reactor to be very high.

By the injection of anti-foam into the top section of reactor, the problem of solids accumulation is solved. Since foaming is reduced or eliminated, the liquid and solids backmixing in the top section of the reactor is increased. Thus, the solids concentration gradient in the top section is reduced or eliminated, and solids concentration in the reactor remains well within normal values, without drawing off a high solids stream (drag stream).

While it is possible to use a very wide range of ratios of anti-foam agent to solvent, e.g. from 1:1 to 1:1000, optimum results are obtained when the ratio is between 1:2 and 1:100.

The flow of carrier solvent has a significant effect on gas voidage. In order for the anti-foam to be effective, it must reach the liquid/gas interface. If the flow of carrier solvent is too low, it inhibits anti-foam distribution to the interface. This effect can be offset by increasing the rate of anti-foam solution itself. But for the best result, carrier solvent flow is required at optimum rate. If the carrier flow is too high, the anti-foam loses effectiveness.

The flow of carrier solvent also has a significant effect on operability with anti-foam, as sudden changes in flow of the concentrated stream should be avoided. Use of carrier solvent eliminates long lines full of concentrated anti-foam and provides for rapid response when required.

The process of this invention has particular application to the hydroconversion of heavy hydrocarbon oils in the presence of additives or catalysts which may be added to the heavy hydrocarbon oils or produced in situ by adding small amounts of metals to the oil as oil-soluble metal compounds. Although the invention is not limited to the use of any particular additives or catalyst, materials are preferably used which inhibit coke formation in the reactor and which preferably also possess hydrogenation activity. Typically, the catalytically active metal component is selected from the metals of Group V-B, VI-B, VII-B and VIII of the Periodic Table of Elements. Iron compounds are particularly preferred, e.g. elemental iron, iron salts such as iron sulphate, iron oxides, iron sulphides, naturally occurring iron ores, such as pyrite, pyratite, hematite and magnetite, iron-containing ash derived from coal, bitumen and the like, fly ash and iron-containing by-product from metal refining processes and mixtures thereof. Carbonaceous additives, such as coal or coke particles, may also be used either alone or in combination with the metal component.

The oil-soluble metal compounds may be selected from inorganic metal compounds, salts of organic acids, salts of organic amines and organometallic compounds, in which the metal is selected from the group consisting of Group V-B, VI-B, VII-B and VIII of the Periodic Table of Elements and mixtures thereof. Preferably, these oil-soluble metal compounds are selected from salts of acyclic aliphatic carboxylic acids and salts of aliphatic carobyxlic acids, with the metal being selected from molybdenum, chromium and vanadium.

The additive or catalyst is preferably used in an amount of 0.001 to 5% by weight based on the heavy oil. Such process is typically carried out at reaction pressures of 28 to 280 kg./sq.cm. and temperatures in the range of 400° to 490° C. in the presence of 14–1,400 s.c.m. of hydrogen per barrel of hydrocarbon oil.

When iron sulphate is used as additive, it can be hepta-hydrate, $FeSO_4.7H_2O$ or monohydrate $FeSO_4.H_2O$ or in fact any form of iron sulphate. The additive is prepared by grinding the iron sulphate to an average size of less than 100 microns, and preferably less than 10 microns. The grinding can be done in a dry fine grinder or a wet grinder. In the case of dry fine grinder, additive slurry is prepared by mixing the finely ground iron sulphate with the hydrocarbon stream which could be the hydrocracking feed itself or a product stream or a virgin hydrocarbon stream. In the case of wet grinding, the iron sulphate is finely ground in the presence of a hydrocarbon stream. As a result, a slurry is prepared in which the concentration of iron sulphate may vary from 2 to 50 wt. %.

According to a preferred embodiment, the iron additive slurry described above is mixed with a heavy hydrocarbon oil feed and pumped along with hydrogen through a vertical reactor. Anti-foam solution is injected into the top section of the reactor. The reaction is preferably carried out at a reactor pressure from 5 to 20 MPa, reactor temperature from 400° to 470° C. and liquid hourly space velocity from 0.02 to 10.0. High conversion is achieved due to low gas voidage, high liquid residence time and better liquid backmixing.

The liquid-gas mixture from the top of the hydrocracking zone can be separated in a number of different ways. One possibility is to separate the liquid-gas mixture in a hot separator kept between 200°–470° C. and at the pressure of the hydrocracking reaction. The heavy hydrocarbon oil product from the hot separator can either be recycled or sent to secondary treatment.

The gaseous stream from the hot separator containing a mixture of hydrocarbon gases and hydrogen is further cooled and separated in a low temperature-high pressure separator. By using this type of separator, the outlet gaseous stream obtained contains mostly hydrogen with some impurities such as hydrogen sulphide and light hydrocarbon gases. This gaseous stream is passed through a scrubber and the scrubbed hydrogen is recycled as part of the hydrogen feed to the hydrocracking process. The recycled hydrogen gas purity is maintained by adjusting scrubbing conditions and by adding make up hydrogen.

The liquid stream from the low temperature-high pressure separator represents the light hydrocarbon oil product of the present process and can be sent for secondary treatment.

The spent additive is carried over with the heavy oil product from the hot separator and is found in the 524° C.+ pitch fraction. However, since this is a very cheap additive, it need not be recovered and can be burned or gasified with the pitch. At hydrocracking conditions, the iron sulphate is converted to iron sulphide.

For a better understanding of the invention, reference is made to the accompanying drawings which illustrates diagrammatically a preferred embodiment of the present invention. In the drawings.

Figure 1:
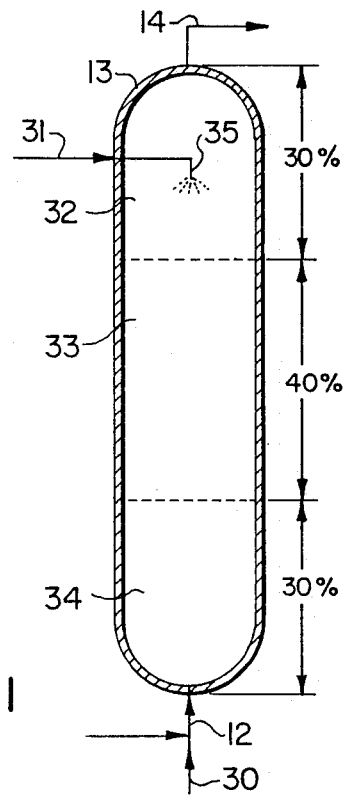
FIG. 1 is a schematic illustration of a hydrocracking reactor.

FIG. 1 shows schematically a typical tubular hydrocracking reactor. Such a reactor is typically in the form of a bubble column 13 having a feedstock inlet line 12 and a top discharge line 14. Line 30 is a recycled hydrogen and make-up hydrogen line.

As shown in FIG. 1, the tubular reactor can be looked upon as consisting of three main sections, namely a top section 32, a middle section 33 and a bottom section 34. The top and bottom sections each comprise about 30% of the height of the column, with the middle section making up the remaining 40% of the height of the column. The anti-foaming agent or solution of anti-foaming agent in light oil is injected according to the invention through inlet line 31 into the top section 32. The actual injection is preferably done through nozzle or nozzles 35 which direct a downward spray into the top section.

Figure 3:
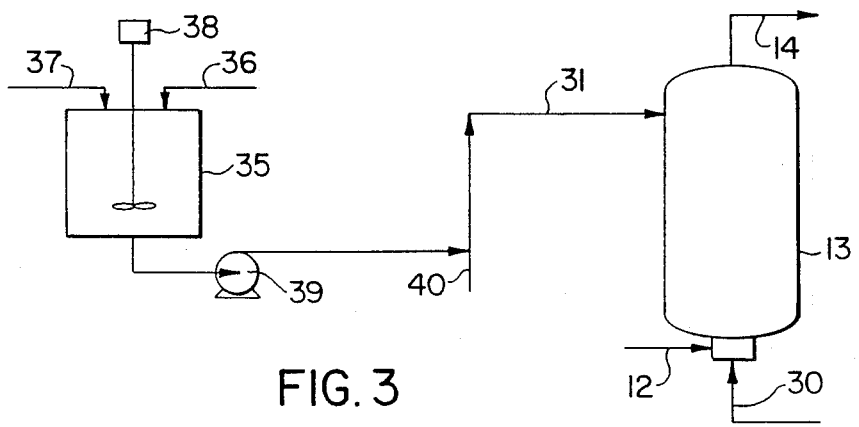
FIG. 3 is a schematic illustration of an anti-foam delivery system.

The system for preparing the anti-foaming agent is shown in FIG. 3 and this is prepared in a mixing vessel 35 having a mixer 38. An anti-foam agent is fed into the mixer via line 37 and a hydrocarbon solvent is fed into the mixer via line 36. After mixing, the solution obtained is pumped into a carrier line 40 via high pressure injection pump 39. The carrier line serves to further dilute the mixture prior to injection into reactor 13.

Figure 2:
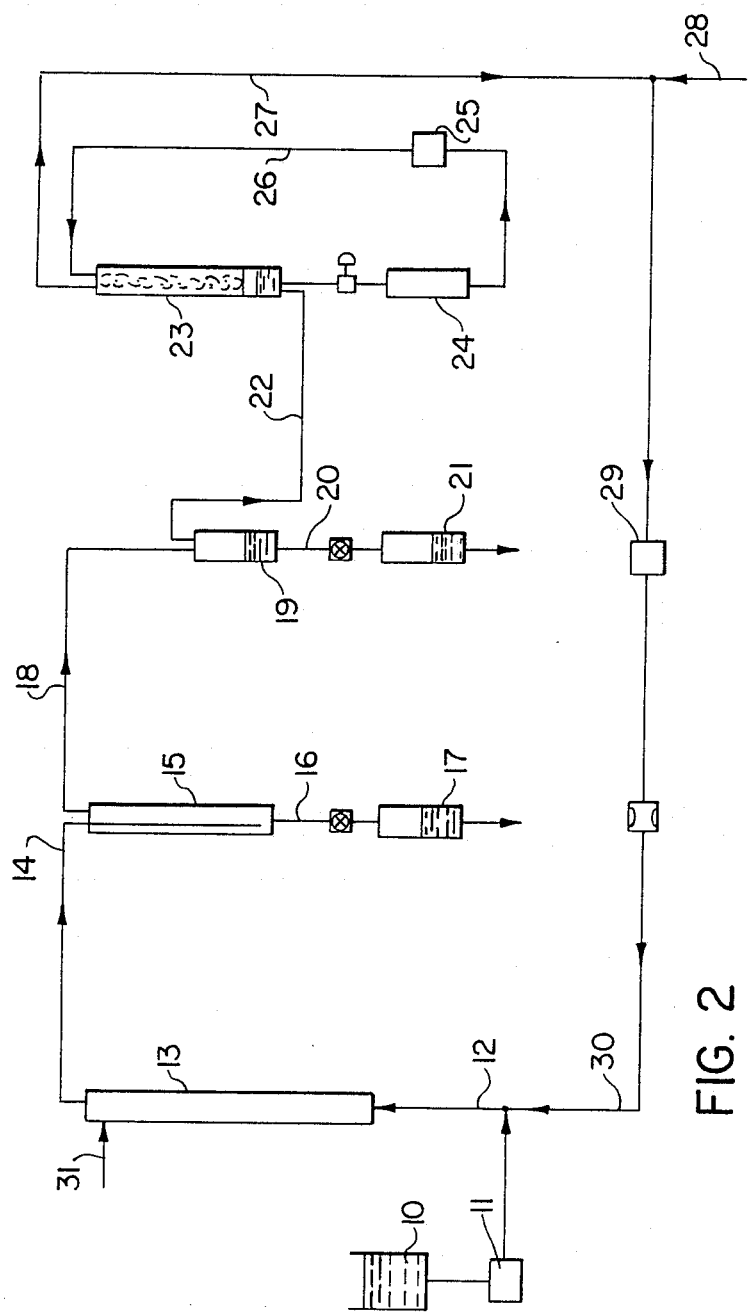
FIG. 2 is a schematic flow diagram showing a hydrocracking process.

In the hydrocracking process as shown in FIG. 2, the iron sulphate additive slurry is mixed together with a heavy hydrocarbon oil feed in a feed tank 10 to form a slurry. This slurry is pumped via feed pump 11 through inlet line 12 into the bottom of reactor tower 13. Recycled hydrogen and make up hydrogen from line 30 is simultaneously fed into the tower through line 12. Anti-foam solution is injected into the top section of the reactor through line 31. A gas-liquid mixture is withdrawn from the top of the tower through line 14 and introduced into a hot separator 15. In the hot separator the effluent from tower 13 is separated into a gaseous stream 18 and a liquid stream 16. The liquid stream 16 is in the form of heavy oil which is collected at 17.

According to an alternative feature, a branch line is connected to line 16. This branch line connects through a pump into inlet line 12, and serves as a recycle for recycling the liquid stream containing carried over metal sulphide particles from hot separator 15 back into the feed slurry to tower 13.

In yet another embodiment, the line 16 feeds into a cyclone separator which separates the metal sulphide particles from the liquid stream. The separated metal sulphide particles are recycled into the feed slurry to tower 13, while the remaining liquid is collected in vessel 17.

The gaseous stream from hot separator 15 is carried by way of line 18 into a high pressure-low temperature separator 19. Within this separator, the product is separated into a gaseous stream rich in hydrogen which is drawn off through line 22 and an oil product which is drawn off through line 20 and collected at 21.

The hydrogen rich stream 22 is passed through a packed scrubbing tower 23 where it is scrubbed by means of a scrubbing liquid 24 which is recycled through the tower by means of pump 25 and recycle loop 26. The scrubbed hydrogen rich stream emerges from the scrubber via line 27 and is combined with fresh make up hydrogen added through line 28 and recycled through recycle gas pump 29 and line 30 back to tower 13.

Certain preferred embodiments of this invention will now be further illustrated by the following non-limitative examples.

EXAMPLE 1

An anti-foam solution was prepared by mixing a polysiloxane anti-foaming agent available under the trade mark ALCHEM-5742 with middle hydrocarbon distillate in a volume ratio of 1:3.

Anti-foam tests were conducted on a 5000 bbl/day hydrocracking reactor operating at the following conditions:

| | |
|---|---|
| Reactor temperature, °C. | 390–443 |

-continued

| | |
|---|---|
| Reactor pressure, MPa | 13.9 |
| LHSV | 0.2–0.6 |

No particulate additive was used, and tests were conducted without anti-foam as well as with anti-foam at different locations in the reactor. The following results were obtained:

| Test No. | Location of Injection of Anti-foam Solution | Average Gas Voidage in the Reactor |
|---|---|---|
| 1 | None | 70% |
| 2 | 7 ppm in the bottom | 64% |
| 3 | 7 ppm in the top | 31% |

In the first test, pitch conversion was 15 wt. %. When the anti-foam was injected in the bottom section, gas voidage dropped to 64% and pitch conversion increased to 17%. Best results were obtained when the anti-foam was injected in the top section of the reactor. In this case, pitch conversion increased to 30 wt. %.

EXAMPLE 2

The anti-foam solution was prepared by mixing AL-CHEM-5742 ® anti-foaming agent with middle hydrocarbon distillate in a volume ratio of 1:3.

The additive slurry was prepared by grinding iron sulphate mono-hydrate in a hammer-mill to an average particle size of 20 microns. The finely ground iron sulphate was mixed with heavy oil in a weight ratio of 1:7.3. This resulted in an additive slurry which contained 12% iron sulphate.

The additive slurry was pumped through an inlet line into the bottom of a 5000 bbl/day hydrocracking reactor as shown in FIG. 2. Recycled hydrogen and make-up hydrogen were simultaneously fed to the reactor.

The anti-foam solution Was injected into the "carrier" solvent line. The rate of anti-foam solution injection was varied to determine its effect on hydroconversion of heavy oil and on reactor hydrodynamics.

The reactor was operated under following conditions:

| Operating Conditions | Test #4 | Test #5 |
|---|---|---|
| Reactor temp. °C. | 430–460 | 430–460 |
| Reactor pressure, MPa | 13.9 | 13.9 |
| LHSV | 0.3–0.6 | 0.2–0.6 |
| Additive Slurry conc., wt. % | 12 | 12 |
| Additive conc. in total feed, wt. % | 2.5 | 2.5 |
| Anti-foam, ppm on feed | 0 | 20 |

The results obtained from the runs were as follows:

| | Test #4 | Test #5 |
|---|---|---|
| Avg. gas voidage % | 75 | 30 |
| Pitch conversion, wt. % | 50 | 80 |
| Relative liquid backmixing | 1 | 10 |
| Temperature gradient, °C. | 10 | 1 |

We claim:

1. In a process for hydrocracking heavy hydrocarbon oil wherein a slurry of said heavy oil and an additive or catalyst is subjected to hydroconversion conditions in the presence of hydrogen in a vertical hydroconversion column such that a liquid/gas interface is formed in an upper section of said column and foaming conditions are created in the column, said foaming conditions reducing the efficiency of the hydrocracking process, the improvement which comprises injecting an anti-foaming agent into a region within the upper 30% of the hydrocracking column height such that it is distributed to the liquid/gas interface whereby the formation of foaming conditions within the column is substantially reduced.

2. The process of claim 1 wherein the anti-foaming agent is in the form of a solution of an anti-foaming agent and a hydrocarbon solvent.

3. The process of claim 2 wherein the hydrocarbon solvent is a light oil.

4. The process of claim 3 wherein the anti-foaming solution contains anti-foaming agent and solvent in the ratios of between 1:2 and 1:100.

5. The process of claim 1 wherein the additive or catalyst is a finely divided solid additive or catalyst.

6. The process of claim 1 wherein the additive or catalyst is an oil-soluble metal compound which forms an additive or catalyst in situ under processing conditions.

7. The process of claim 5 wherein the additive or catalyst is a carbonaceous material, iron, an iron compound or mixtures thereof.

8. The process of claim 7 wherein the additive or catalyst also contains a metal of Group V-B, VII-B or VIII of the Periodic Table of Elements.

9. The process of claim 1 wherein the additive is finely divided iron sulphate having particle sizes of less than 100 microns.

10. The process of claim 9 wherein the iron sulphate particles have size of less than 10 micorns.

11. The process of claim 9 wherein the iron sulphate is present in an amount of less than 5% by weight based on the heavy oil.

* * * * *